(12) United States Patent
Vincent

(10) Patent No.: US 6,741,739 B1
(45) Date of Patent: May 25, 2004

(54) METHOD AND APPARATUS FOR IMPROVING SIGNAL TO NOISE RATIO USING WAVELET DECOMPOSITION AND FREQUENCY THRESHOLDING

(75) Inventor: David L. Vincent, Huntington Beach, CA (US)

(73) Assignee: ITT Manufacturing Enterprises, Wilmington, DE (US)

( * ) Notice: Subject to any disclaimer, the term of this patent is extended or adjusted under 35 U.S.C. 154(b) by 0 days.

(21) Appl. No.: 09/563,453

(22) Filed: May 3, 2000

(51) Int. Cl.$^7$ .............................. G06K 9/46; G06K 9/40
(52) U.S. Cl. ....................................... 382/191; 382/254
(58) Field of Search ............................... 382/191, 254, 382/260, 269, 275, 130, 261, 321; 348/606, 624, 625, 537; 358/1.9–3.31, 447, 461, 463; 702/191; 704/235

(56) References Cited

U.S. PATENT DOCUMENTS

| | | | |
|---|---|---|---|
| 3,953,822 A | | 4/1976 | Vilkomerson ................ 367/11 |
| 4,330,833 A | | 5/1982 | Pratt et al. .................. 382/265 |
| 4,463,381 A | | 7/1984 | Powell et al. ............... 348/625 |
| 5,721,694 A | * | 2/1998 | Graupe ....................... 702/191 |
| 5,768,474 A | * | 6/1998 | Neti ........................... 704/235 |
| 5,825,936 A | | 10/1998 | Clarke et al. ............... 382/261 |
| 5,867,606 A | * | 2/1999 | Tretter ........................ 382/261 |
| 5,920,652 A | * | 7/1999 | Wilkinson .................. 382/260 |
| 5,991,457 A | * | 11/1999 | Ito et al. ..................... 382/254 |
| 6,069,982 A | * | 5/2000 | Reuman ...................... 382/275 |
| 6,240,219 B1 | * | 5/2001 | Gregory ...................... 382/321 |
| 6,295,392 B1 | * | 9/2001 | Gregory et al. ............. 382/321 |

OTHER PUBLICATIONS

Bodin et al., "Spectral subtraction in the time–frequency domain using wavelet packets", IEEE 1997, pp. 47–48.* de Perez et al., "Noise reduction and loudness compression in a wavelet modelling of the auditory system", IEEE 2000.*

Soon et al., "Wavelet for speech denoising", IEEE TENCON 1997.*

Yu, R. et al. "An optimal wavelet thresholding method for speckle noise reduction", Department of Engineering, University of Aberdeen, Aberdeen AB24 3UE, United Kingdom.

"Ideal Spatial Adaptation by Wavelet Shrinkage", David L. Donoho, Iain M. Johnstone, Jun. 1992 (revised Apr. 1993).

"Generalized Cross Validation for Wavelet Thresholding", Maarten Jansen, Maurits Malfait, Adhemar Bultheel, Jan. 1996 (revised Jul. 26, 1996).

"Translation–Invariant De–Noising", R.R. Coifman and D.L. Donoho.

"De–Noising by Soft–Thresholding", David L. Donoho.

"Multiple Wavelet Threshold Estimation by Generalized Cross Validation for Data with Correlated Noise", Maarten Jansen, Adhemar Bultheel, Dec. 30, 1996.

"Wavelet–Domain Filtering for Photon Imaging Systems", Robert D. Nowak, Richard G. Baraniuk, Apr. 1997.

Donoho, D.L., et al., "Ideal Spatial Adaptation by Wavelet Shrinkage," Dept. of Statistics, Stanford Univ., Stanford, CA, Jun. 1992, revised Apr. 1993, pp. 1–30 and figures.

(List continued on next page.)

*Primary Examiner*—Andrew W. Johns
*Assistant Examiner*—Amir Alavi
(74) *Attorney, Agent, or Firm*—Edell Shapiro & Finnan, LLC; Martin Abramson

(57) ABSTRACT

A method and apparatus for improving the signal to noise ratio of an information carrying signal wherein a wavelet transform up to a predetermined level is computed, a frequency thresholded signal which is indicative of noise is derived from the wavelet transform, and the frequency thresholded signal is subtracted from the information carrying signal.

61 Claims, 16 Drawing Sheets

OTHER PUBLICATIONS

Jansen, M., et al., "Generalized Cross Validation for wavelet thresholding," Jan. 1996, Revised Jul. 26, 1996, To appear in Signal Processing 56(1), pp. 1–3.

Coifman, R.R., et al., "Translation–Invariant De–Noising," Yale University and Stanford University, pp. 1–26.

Donoho, D.L., et al., "De–Noising By Soft–Thresholding," Dept. of Statistics, Stanford Univ., pp. 1037.

Jansen, M., et al., "Multiple wavelet threshold estimation by generalized cross validation for data with correlated noise," Draft, Dec. 30, 1996, pp. 1–24.

Nowak, R.D., et al., "Wavelet–Domain Filtering for Photon Imaging Systems," Sub. to IEEE Transactions on Image Processing, Apr. 1997, EDICS No.: IP–1.6 Multiresolution Processing, IP–1.2 Filtering, pp. 1–21.

* cited by examiner

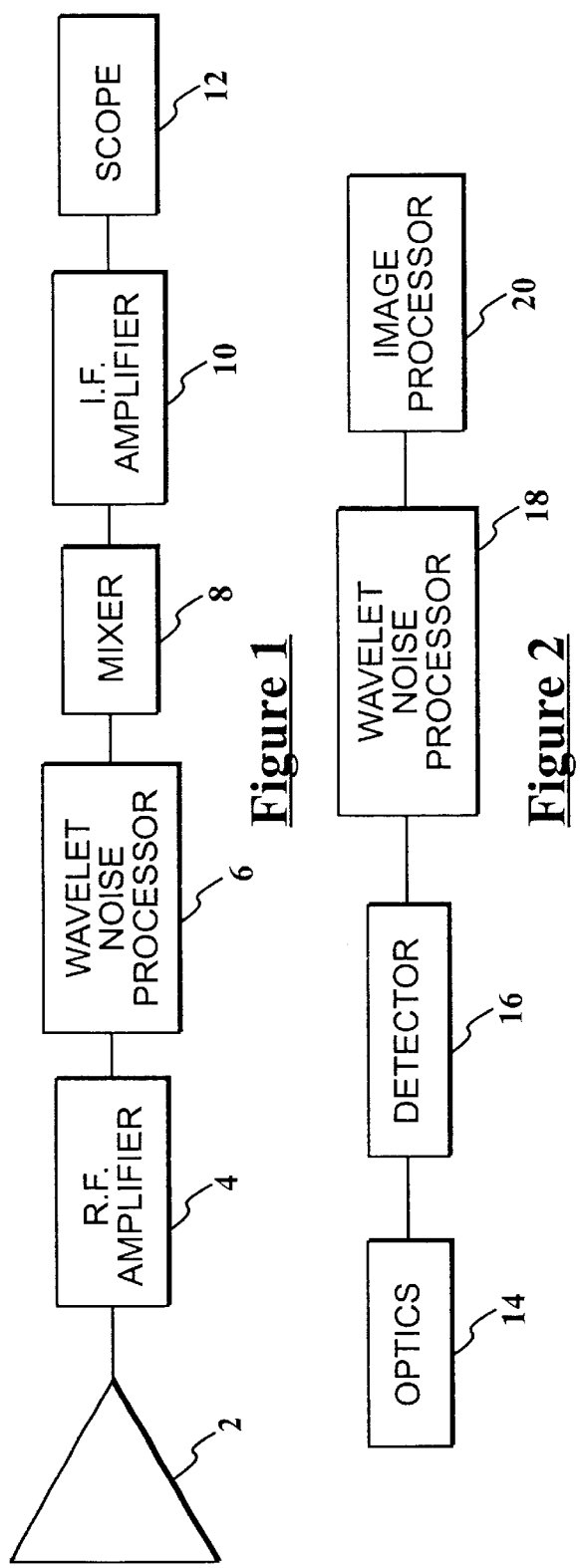
Figure 1
Figure 2
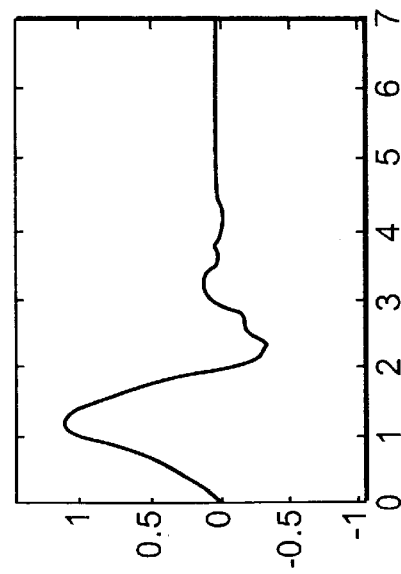
Figure 3A
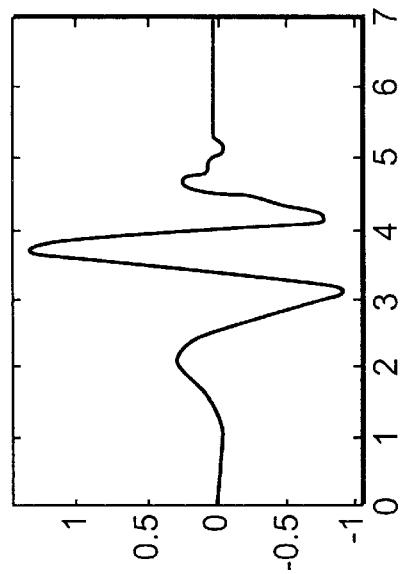
Figure 3B

Truth Image Components illustrate frequency and spatial location properties of wavelet transform

 
Noisy Scene - SNR=20
Figure 13A
D4 Wavelet Levels 2 and 5
5X SNR Improvement
Figure 13B

METHOD AND APPARATUS FOR IMPROVING SIGNAL TO NOISE RATIO USING WAVELET DECOMPOSITION AND FREQUENCY THRESHOLDING

BACKGROUND OF THE INVENTION

1. Field of the Invention

The present invention is directed to a method and apparatus for improving the signal to noise ratio of an information carrying signal.

2. Description of Related Art

In the practice of many technologies, an information carrying signal is produced. A few examples of such technologies are imaging with a camera or opto-electronic sensor, radio and television communications, and medical imaging with magnetic resonance. The usefulness of the information carrying signal is dependent on its clarity, and noise in the signal, which is an inevitable result of physical and electrical processes, places a limitation on such clarity. Thus, it is desirable to be able to eliminate noise to the greatest degree possible, or, equivalently, to increase the signal to noise ratio of the information carrying signal.

Different approaches, such as those using various types of filters are known to improve signal to noise ratio. One type of approach, to which the present invention pertains, uses a mathematical operator known as a wavelet transform. Thus, it is well known that an electrical signal typically has an amplitude which varies with time, thus creating a frequency content in the signal. Certain types of information, for example, optical information, also has a spatial variance, and such is frequently converted to a time context in the electrical signal which results from the detection of the optical information.

To obviate noise, the electrical signal may be processed in the frequency domain, for instance, with a simple filter, or in a higher mathematical order domain known as a transform domain. For example, in the art of signal processing, the Fourier transform is a commonly used transform domain. However the wavelet transform domain possesses advantages over the Fourier domain because while the Fourier domain addresses only the frequency content of a signal, the wavelet transform places the frequency content within a spatial context. Thus, the wavelet transform is capable of producing improved signal to noise ratio as compared with the Fourier transform, including signals with sharper edges.

There are several approaches which are already known for using the wavelet transform for improving signal to noise ratio. However, each of these approaches includes disadvantages which are overcome by the present invention. The known approaches are as follows:

(a) The wavelet shrinkage approach described in Ideal Spatial Adaption via Wavelet Shrinkage, Donoho, D. L., and Johnstone, I. M., Technical Report/Revised Technical Report, Stanford University 1992, 1993 and 1994, Biometrika, 81:425–455. This approach uses wavelet decomposition to identify the different frequency/spatial components of the image or signal of interest. A statistically derived "universal threshold" based upon the original image amplitude standard deviation (or estimate thereof) is then used to threshold or shrink the amplitudes of the wavelet coefficients. After an inverse wavelet transform is performed, the image or signal is recovered, but with somewhat reduced high frequency noise.

(b) The soft thresholding approach was developed as an improvement on wavelet shrinkage and uses an amplitude adaptive threshold to optimize the performance of the algorithm at each level of wavelet decomposition. See De-Noising via Soft Thresholding, Donoho, D. L., Technical Report 409, 1992 Department of Statistics, Stanford University.

(c) The cycle-spinning technique described in Translation-Invariant De-Noising, Coifman, R. R., and Donoho, D. L., Technical Report, Department of Statistics, Stanford University 1995, uses both the wavelet shrinkage approach [a] and soft thresholding approach [b], and applies the techniques to multiple phase-shifts of the input signal or image. The results for each phase shift are then averaged together, resulting in a reduction in noise compared to the input signal/image.

(d) The cross validation approach uses the soft thresholding technique mentioned previously in [b] and uses a curve fitting approach to the input data to develop a better noise estimate, and hence, a better threshold value, than the "universal threshold" devised by Donoho et al. See Generalized Cross Validation for Wavelet Thresholding, Jansen, M., Malfait, M., Bultheel, A., 1996.

(e) The wavelet domain filtering approach is described in Wavelet Domain Filtering for Photon Imaging Systems Nowak, R. D., and Baraniuk, R. G., submitted April 1997 to IEEE Transactions on Image Processing. In this technique, the image acquisition period is subdivided into many shorter images, to form a series of images that are affected by the same Poisson noise process. A Wiener-type filter is constructed, using the input data to perform a cross-validation similar to the device in [d]. This technique is claimed to provide good noise removal properties, with a minimum of image degradation or edge softening.

A problem with all of the above techniques (a) to (e) is that they suffer from the need to develop an estimate of the noise in the image in order to compute an appropriate threshold. Because the noise may be composed of both Gaussian and Poisson components, as well as both additive and multiplicative errors, this limits the effectiveness of each of these approaches. For techniques [a] through [c], in fact, it appears that signal-to-noise improvement of greater than 1.2× is unlikely. Technique [d], because of the cross-validation optimization process, has demonstrated a signal-to-noise improvement of approximately 1.5× while technique [e] has somewhat better performance, with a demonstrated improvement of approximately 2.4× in signal-to-noise. However, techniques [d] and [e], also require a large number of calculations to compute their optimized thresholds, and may not work well on complex images, due to the large numbers of feature edges present that could skew the noise estimates of these algorithms.

SUMMARY OF THE INVENTION

In distinction to the prior art, which as described above, uses amplitude thresholding of the noise components, the present invention uses frequency thresholding. The wavelet transform may be advantageously adapted to this approach since it has the capability of automatically classifying information according to frequencies.

Thus, in accordance with an aspect of the present invention, a method of improving the signal to noise ratio of an information carrying signal is provided comprising the steps of, computing a wavelet transform of the information carrying signal up to a predetermined level, from the wavelet transform, deriving a frequency thresholded signal which is indicative of noise, and subtracting the frequency thresholded signal from the information carrying signal to provide a resultant signal having an improved signal to noise ratio.

With the use of the present invention, greater improvement in signal to noise ratio than with the prior art is obtainable. Also, since no thresholds need be computed and large numbers of calculations are avoided, much of the processing which is required by the prior art is eliminated.

BRIEF DESCRIPTION OF THE DRAWINGS

The invention will be better understood by referring to the accompanying drawings wherein:

FIG. 1 is a block diagram of a radar receiver;

FIG. 2 shows an optical imaging system;

FIGS. 3A and 3B show a Daubechies 4 (D4) wavelet transform pair;

FIG. 13A shows a close up of the bar target from the noisy image;

FIG. 13B shows a close-up of the bar target from the recovered image, demonstrating a 5× signal to noise ratio improvement;

DETAILED DESCRIPTION OF PREFERRED EMBODIMENT

Figure 4:
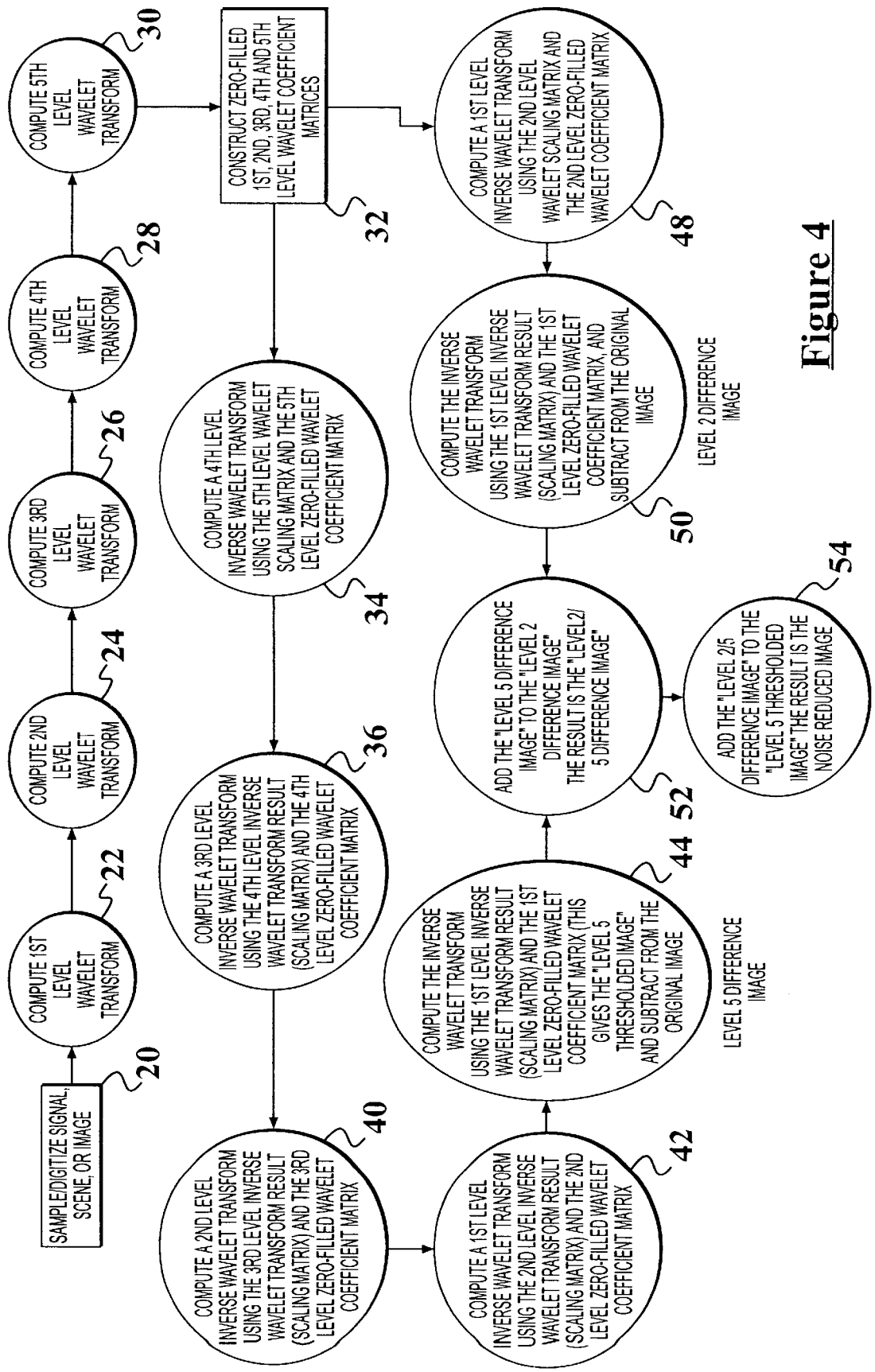
FIG. 4 is a block diagram representing a preferred embodiment of the invention.

FIGS. 1 and 2 are two examples of the many diverse types of systems which produce information carrying signals containing noise, to which the present invention pertains.

Referring to FIG. 1, a block diagram of a radar receiver is depicted. A radar transmitter (not shown) sends out pulses, and as the radar receiver antenna 2 is moved, reflected pulses are received coming from different directions, and are passed on to R.F. amplifier 4 for amplification. Since the received pulses are in the presence of noise, if the received pulses are too small, they will not be detected at the output, but will be lost in the noise. To improve the signal to noise ratio, wavelet noise processor 6, performing in accordance with the teachings of the present invention is provided. An information carrying signal with improved signal to noise ratio can then be passed to mixer 8 wherein it is converted to an intermediate frequency (I.F.), and from there to I.F. amplifier 10 and scope 12, where the improved signal is displayed.

While the invention is directed to minimizing noise in the most general case, it is particularly useful for doing so in an optical imaging system. Such a system is depicted in FIG. 2, and is seen to include a sensor comprised of optics 14 and detector array 16, and imaging processor 18. Noise in an optical imaging system can manifest itself as blurring, fuzzy features edges, or complete obscuring of image features or of regions of the image.

A television camera is an example of an optical imaging system, but systems having improved resolution which can view, display and/or record images from great distances (e.g. from outer space) are also possible, and will benefit from signal to noise improvement. Such systems are disclosed in co-pending applications Ser. Nos. 08/763,610 and 09/081,842 filed on Dec. 11, 1996 and May 20, 1998 respectively, which are in their entireties incorporated herein by reference. In a system such as described in application Ser. No. 09/081,842, processor 18 in FIG. 2 herein is a superresolution processor which is capable of providing resolution to beyond the cut-off frequency of optics 14. In accordance with the present invention, wavelet noise processor 20 is provided, for example, at the output of the detector array 16, to enhance the signal to noise ratio.

As described above, the present invention utilizes wavelet transform processing. A wavelet is a mathematical operator comprised of a transform pair, and there are different types of wavelets having different technical names, such as Daubechies 4, Daubechies 6, etc. For purposes of illustration, the Daubechies 4 wavelet, which may be utilized in the present invention, is shown in FIGS. 3A and 3B. The wavelet is seen to be comprised of the transform pair Φ and ψ, each being a predetermined waveform. When the information carrying signal is multiplied by each of Φ and ψ, ψ acts as a high pass filter while Φ acts as a low pass filter. Thus, the signal is simultaneously subjected to high pass and low pass filtering. The ψ function effectively takes a derivative of the signal, thus providing a matrix of values which represent the difference between adjacent values in a matrix of values comprising the original signal, and the resulting high frequency matrix of values is known as the scaling matrix. On the other hand, the Φ function effectively integrates or takes an average of adjacent values in the original signal matrix, and the resulting matrix of values is known as the wavelet coefficient matrix. Also, each resulting matrix is half the size of the matrix of values representing the original signal in one dimension and the same size in the other dimension. Thus, both the wavelet scaling matrix (high frequency) and the wavelet coefficient matrix (low frequency) together are the same size as the matrix representing the original signal. From the foregoing, it will be appreciated that the wavelet transform matrices have both frequency and spatial information related to the signal being detected. The detailed nature of the high pass and low pass filtering and of the resulting matrices is further explained in connection with later figures, but the invention is now explained in connection with the block diagram of FIG. 4.

Referring to FIG. 4, the information carrying signal/image is first sampled and digitized, as indicated by block 20. In the steps represented by blocks 22, 24, 26, 28 and 30, a process known as wavelet decomposition is performed. That is, wavelet transforms are repeatedly taken in order to isolate high frequency components, which correspond to noise. More particularly, a 1st level wavelet transform of the signal is taken (block 22), and then a further wavelet transform (2nd level) is taken of the 1st level transform, and so on. As can be appreciated from the foregoing explanation of the filtering action of the wavelet transform pairs, at the 1st level, transform content is primarily signal information, but by the time higher order transforms are computed, it is primarily high frequency components which are attributable to noise. Thus, the purpose of the wavelet decomposition is to isolate the high frequency content of the signal, since noise, but not information is generally present at such higher frequencies.

In the preferred embodiment, this is accomplished by computing wavelet transforms up to the fifth level, but it is to be understood that the specific level may be varied while retaining the principle of the invention. Also, it is noted that the terms "high frequency" and "low frequency" as used herein do not refer to absolute values, but rather to relative high and low values as applied to the frequency content of the particular signal/noise combination being processed.

Once the noise is isolated, it is desired to subtract it from the original signal. A restorative process involving the computation of inverse wavelet transforms is necessary to accomplish this. Thus, as described above, each time a wavelet transform is taken, the size of the image is cut in half in one dimension, and since the transform is taken along both dimensions of the image, the resulting image is one-half the size in both dimensions. Thus, by the time the 5th wavelet transform is arrived at, the size of the image is 1/32 of the original. It is necessary to restore the image to its original size before a meaningful subtraction of noise can be effected.

Taking an inverse wavelet transform converts the wavelet transform back to a signal in the time domain, and taking successively lower order transforms restores the size of the signal or image. To take the inverse wavelet transform of a particular level, it is necessary to use the scaling matrix and wavelet coefficient matrix for the level above. However, since the noise information is contained only within the scaling matrix, dummy or "altered" wavelength coefficient matrices are constructed. In the preferred embodiment, the altered matrices are accomplished by setting all coefficients to zero, while retaining the size of the matrix to be the correct size for the transform level to it pertains.

Thus, in the step represented by block 32, 1st, 2nd, 3rd, 4th and 5th level zero-filled wavelet coefficient matrices are constructed. Then, in block 34, the 4th level inverse wavelet transform is computed using the 5th level scaling matrix and the 5th level zero-filled wavelet coefficient matrix. In blocks 36, 40, and 42 the 3rd to 1st inverse wavelet transforms are computed, using for each level, the scaling matrix and the zero-filled wavelet coefficient matrix for the level above. In the step represented by block 44, the inverse wavelet transform for the level below the 1st level is computed using the 1st level scaling matrix and the 1st level zero-filled wavelet coefficient matrix. This results in the LEVEL 5 FREQUENCY THRESHOLDED IMAGE, which corresponds to the noise segregated by the 5th level wavelet transform converted to the time domain. The LEVEL 5 THRESHOLDED IMAGE is subtracted from the original image in block 44 to produce a resultant signal, known as the LEVEL 5 DIFFERENCE IMAGE. This resultant signal has an improved signal to noise ratio as compared to the original image signal, since noise has been subtracted therefrom. This may be used as the final recovered signal, or it may be improved still further, as described below.

It is noted that in certain cases the LEVEL 5 THRESHOLDED IMAGE, may contain a small amount of residual image information (e.g. edge or corner data). This can be due to the fact that while the values in the scaling matrix of the level 5 wavelet transform are substantially attributable to noise, they may contain a small amount of image information since, in some cases it can be difficult to distinguish high frequency image information from noise.

It has been determined that a signal may be found which is useful for compensating for the residual image information.

It has been found that the information in a lower level wavelet transform may be used for such purpose. In the preferred embodiment described herein, such lower level is the 2nd level wavelet transform, although in other embodiments, different levels or combinations thereof may be empirically determined.

The process of generating the compensating signal is represented by blocks 48, 50 and 52. In the step represented by block 48, a 1st level wavelet transform is computed using the 2nd level scaling matrix and the 2nd level zero-filled wavelet coefficient matrix. Then, at block 50, the inverse wavelet transform for the level below the 1st level is computed using the scaling matrix for the 1st level wavelet transform and the zero-filled wavelet coefficient matrix for the 1st level wavelet transform, thereby providing the compensating signal. The result is subtracted from the original image on a pixel by pixel basis, thereby providing an intermediate signal, known as the LEVEL 2 DIFFERENCE LEVEL IMAGE. This is added pixel by pixel to the LEVEL 5 DIFFERENCE IMAGE at block 52, thereby providing the improved LEVEL 2/5 DIFFERENCE IMAGE.

A still further improvement is signal to noise ratio may be possible by incorporating the step of block 54. Here, the LEVEL 5 THRESHOLDED IMAGE is added to the LEVEL 2/5 DIFFERENCE IMAGE. Due to a sign change which occurs each time a wavelet transform is computed, this has the effect of subtracting the noise again, which has been found to further enhance the signal to noise ratio. The result is the NOISE REDUCED IMAGE.

As described above, in the preferred embodiment, the frequency thresholded signal (LEVEL 5 THRESHOLDED SIGNAL in FIG. 4) is derived from a higher order wavelet transform by using altered wavelet coefficient matrices which are zero-filled. However, in other embodiments, different altered matrices can be employed. By way of non-limitative example, the following (or other specific altered matrices) may be used.
  a. The values in the wavelet coefficient matrices may be set to a fixed number other than zero. The number which works best may be determined empirically.
  b. A modified version of amplitude thresholding may be used. An amplitude threshold is selected for the values in the wavelet coefficient matrix, and all values below the threshold are set to zero, while all values above the threshold remain as they are.

Figure 18:
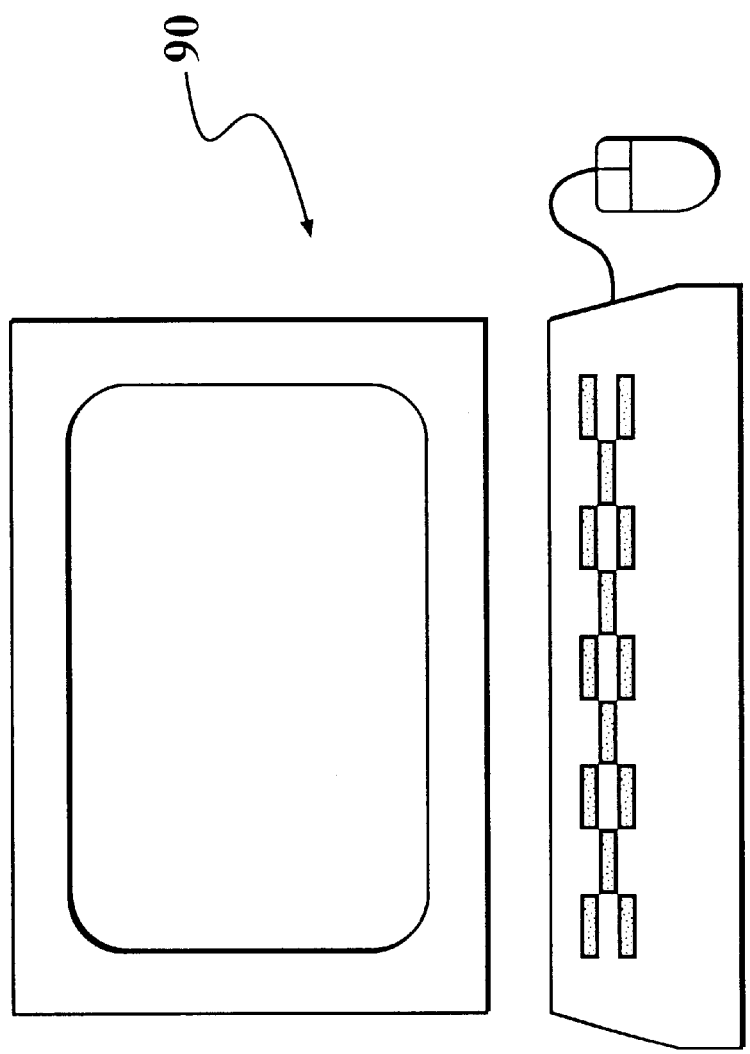
FIG. 18 shows a computer and storage media which may be used to implement the invention.
Figure 18:
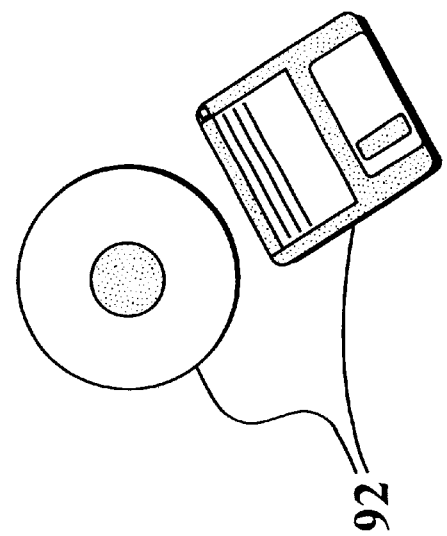

An apparatus aspect of the invention may be implemented in a programmed computer 90, shown in FIG. 18, which carries out the process described above and depicted in FIG. 4. The instructions comprising a computer program may be stored on conventional storage media 92 such as magnetic diskettes or optical disks, which would be read by the computer 90, stored in local memory and executed under the control of the computer.

The invention will be still better understood by referring to FIGS. 5 to 15, which illustrate various stages of the imaging process as well as some of the specific wavelet transforms which may be used.

Figure 5:
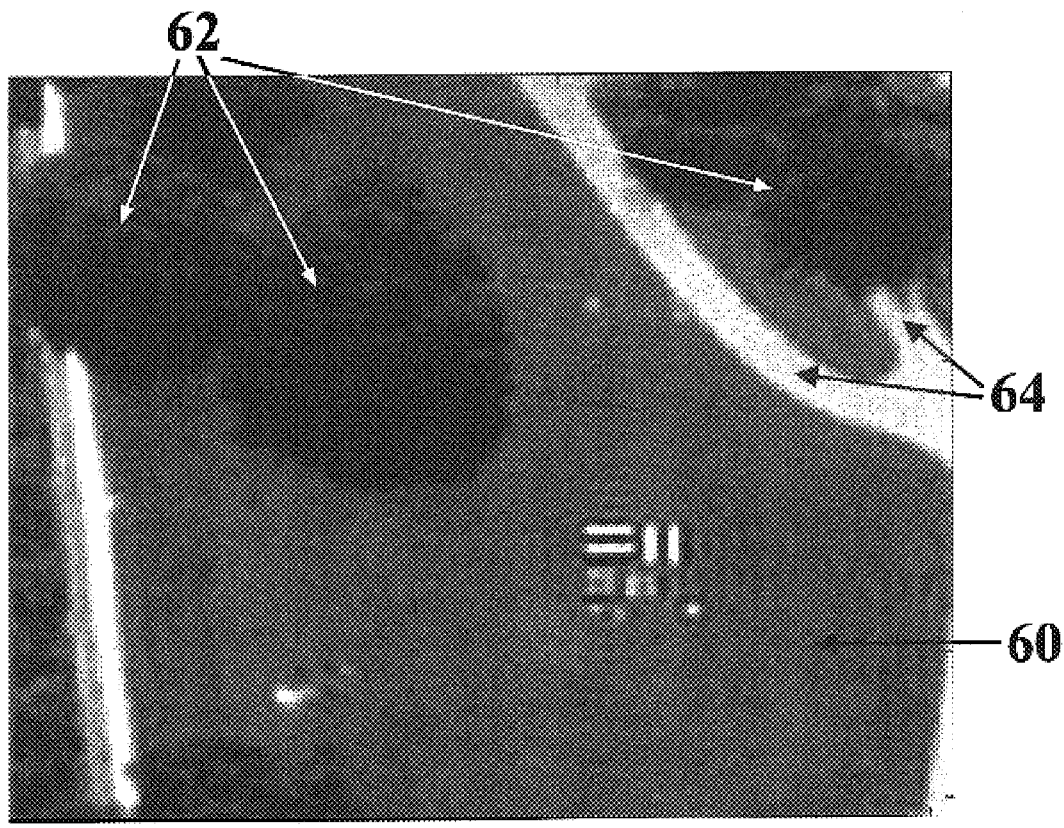
FIG. 5 is a photograph of a reference scene with a superimposed bar target.

FIG. 5 shows a reference scene having a bar target optically superimposed thereon so as to appear as if its on the ground. The reference scene includes grass 60, trees 62, and roads 64.

Figure 6:
FIG. 6 is a photograph of the reference scene of FIG. 5 as imaged through actual optics, where the system has a signal to noise ratio of 20.
Figure 7:
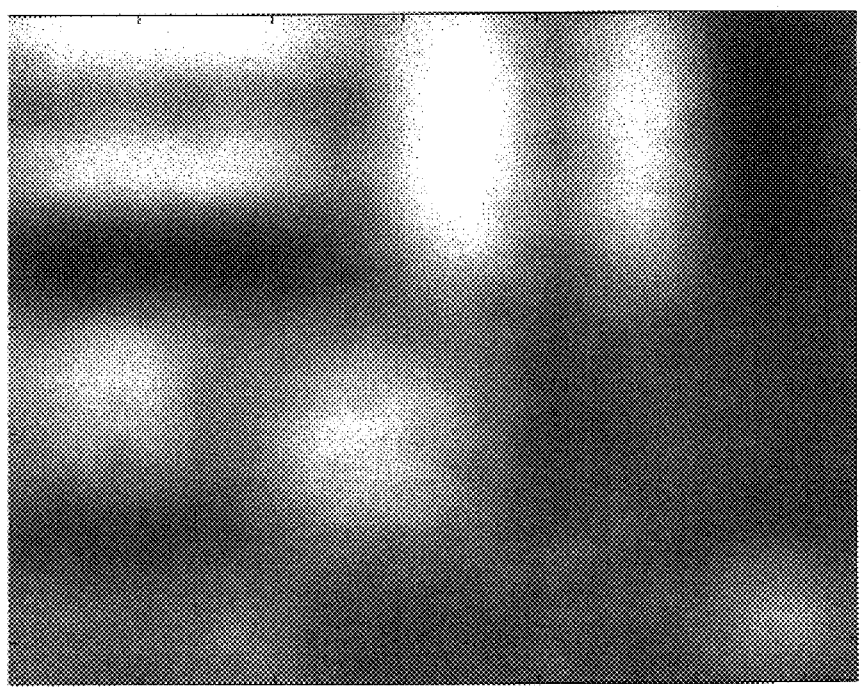
FIG. 7 is a close up photograph of the bar target region from FIG. 6.

FIG. 6 shows the reference scene as imaged through actual optics having a cut-off frequency, wherein the system has a signal to noise ratio of 20 (includes only Gaussian noise). It is seen that most high frequency detail in the background is lost. FIG. 7 is a close-up of the bar target region from the image of FIG. 6.

Figure 8A:
FIG. 8A shows the wavelet coefficient or low pass matrix of the 1st level wavelet transform of the reference scene.
Figure 8B:
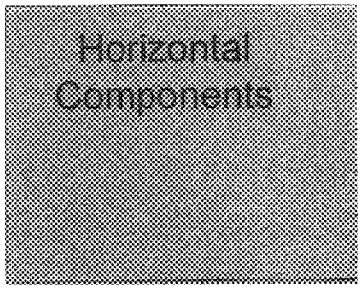
FIG. 8B shows the wavelet scaling or high pass matrix of the vertical components of the reference scene.
Figure 8C:
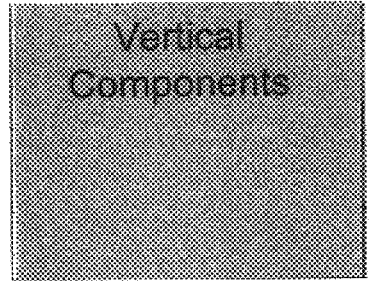
FIG. 8C shows the wavelet scaling or high pass matrix of the horizontal components of the reference scene.
Figure 8D:
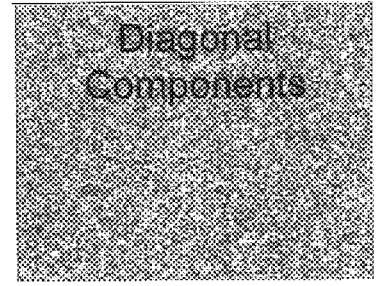
FIG. 8D shows the wavelet scaling or high pass matrix of the diagonal components of the reference scene.

FIGS. 8A to 8D depict matrix components of the 1st level wavelet transform of the reference scene. It should be noted that all matrix components are half the size of the original image in both the horizontal and vertical directions since the wavelet transform is taken in both directions. FIG. 8A is the wavelet coefficient or low pass matrix while FIG. 8B is the scaling or high pass matrix of vertical components. FIG. 8C is the scaling matrix of horizontal components, while FIG. 8D is the scaling matrix of diagonal components, i.e., the cross product of the horizontal and vertical components. These Figures illustrate the frequency and spatial location properties of the wavelet transform.

Figure 9A:
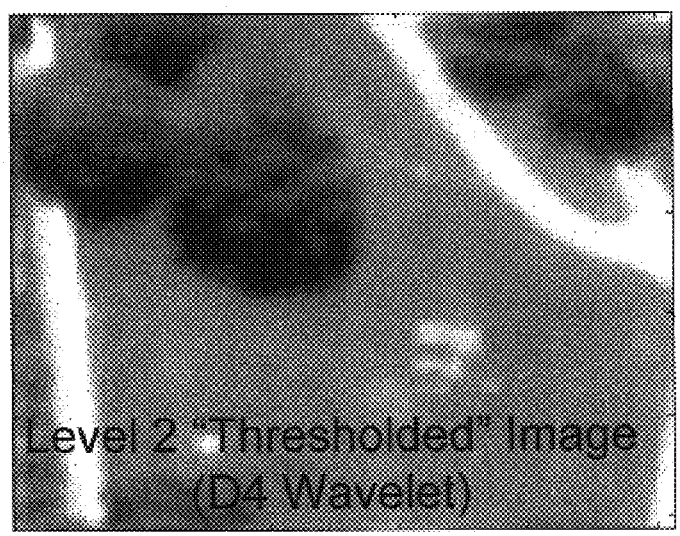
FIG. 9A is a photograph of a LEVEL 2 THRESHOLDED IMAGE.
Figure 9B:
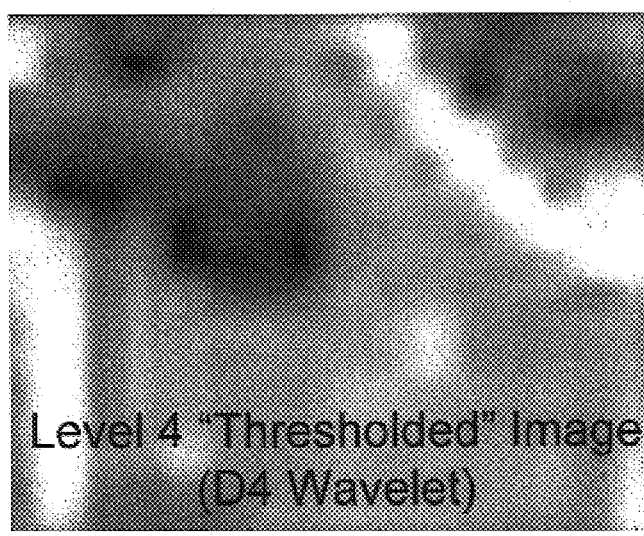
FIG. 9B is a photograph of a LEVEL 4 THRESHOLDED IMAGE.
Figure 9C:
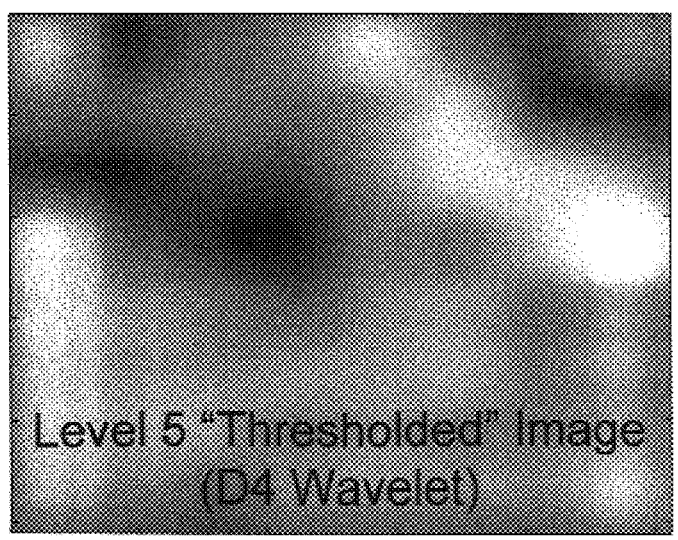
FIG. 9C is a photograph of a LEVEL 5 THRESHOLD IMAGE.

FIGS. 9A, 9B and 9C show a LEVEL 2 THRESHOLD IMAGE, a LEVEL 4 THRESHOLDED IMAGE, and a LEVEL 5 THRESHOLDED IMAGE, respectively, all formed with the D4 wavelet transform. The level 5 thresholded image has been previously discussed in connection with FIG. 4, and it is comprised of noise, which when subtracted from the original image, improves the signal to noise ratio thereof. The LEVEL 2 THRESHOLDED IMAGE is mostly information content, while FIG. 9B shows a LEVEL 4 THRESHOLDED IMAGE, seen to be intermediate the LEVEL 2 and LEVEL 5 THRESHOLDED IMAGES in high frequency content.

Figure 10A:
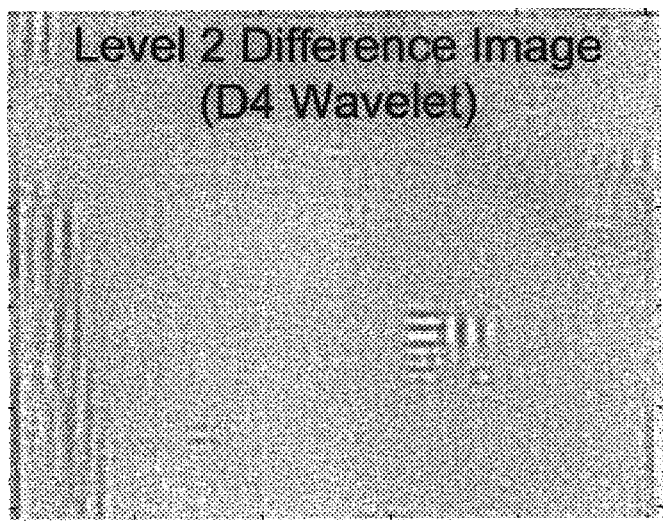
FIG. 10A is a photograph of a LEVEL 2 DIFFERENCE IMAGE.
Figure 10B:
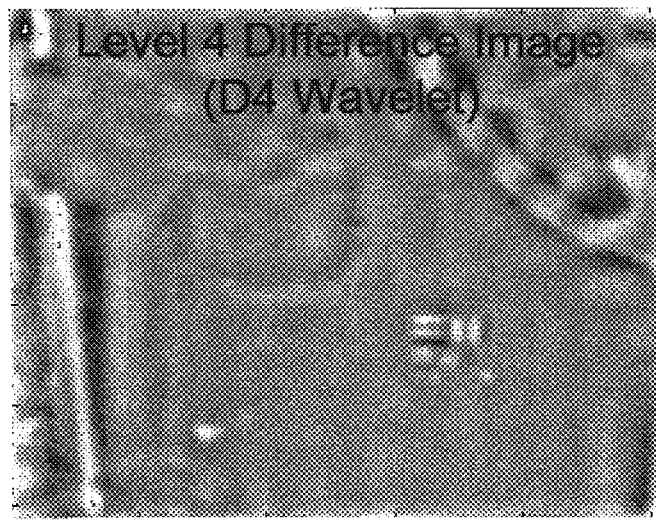
FIG. 10B is a photograph of a LEVEL 4 DIFFERENCE IMAGE.
Figure 10C:
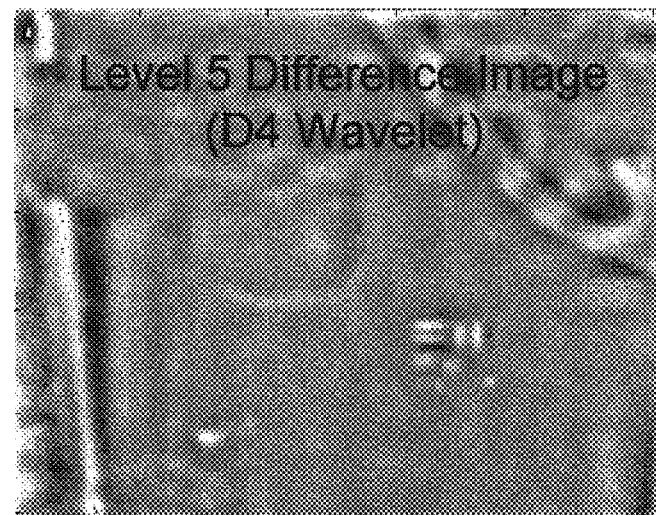
FIG. 10C is a photograph of a LEVEL 5 DIFFERENCE IMAGE.

FIGS. 10A, 10B and 10C show a LEVEL 2 DIFFERENCE IMAGE, a LEVEL 4 DIFFERENCE IMAGE, and a LEVEL 5 DIFFERENCE IMAGE for the D4 wavelet transform, respectively. It will be observed that the LEVEL 4 DIFFERENCE IMAGE and the LEVEL 5 DIFFERENCE IMAGE are quite similar. These images have been corrected for noise, but appear to be somewhat low in contrast.

Figure 11:
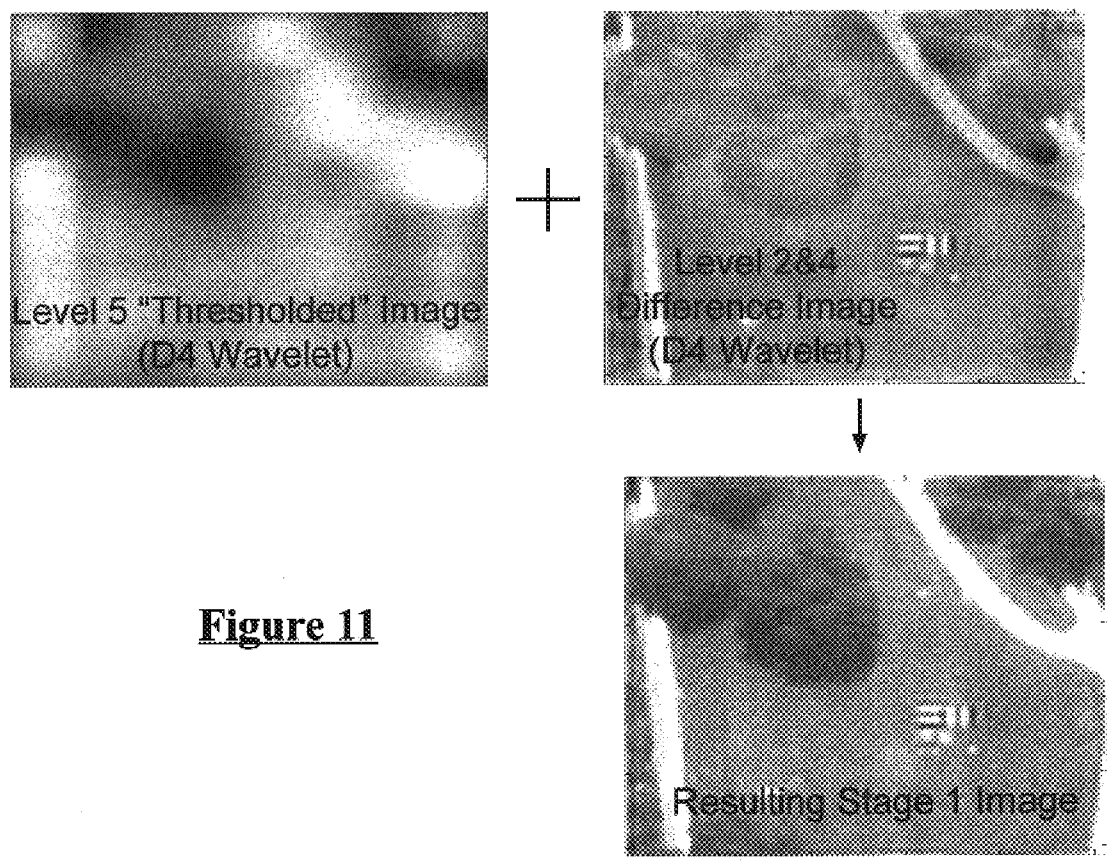
FIG. 11 depicts how adding high and low frequency images results in the desired recovered image.

FIG. 11 illustrates how adding low frequency and high frequency images results in the desired recovered image. This is the step which is performed at block 54 of FIG. 4, except that a LEVEL 2/4 DIFFERENCE IMAGE rather than a LEVEL 2/5 DIFFERENCE IMAGE is depicted in FIG. 11. The resulting recovered image is corrected for noise and is of suitable contrast.

Figure 12:
FIG. 12 depicts the desired recovered image when the LEVEL 2/5 DIFFERENCE IMAGE is used.

The resulting recovered image using the LEVEL 2/5 DIFFERENCE IMAGE and the Daubechies 4 (D4) wavelet, are shown in FIG. 12. FIG. 13B shows a close-up of the bar target of FIG. 12, which demonstrates a 5× signal to noise ratio improvement when compared with the close-up of the bar target of the noisy image of FIG. 7 (shown in FIG. 13A for purposes of comparison). This compares favorably with the improvements of 1× to 2.4× obtained with the prior art heretofore discussed.

Figure 14:
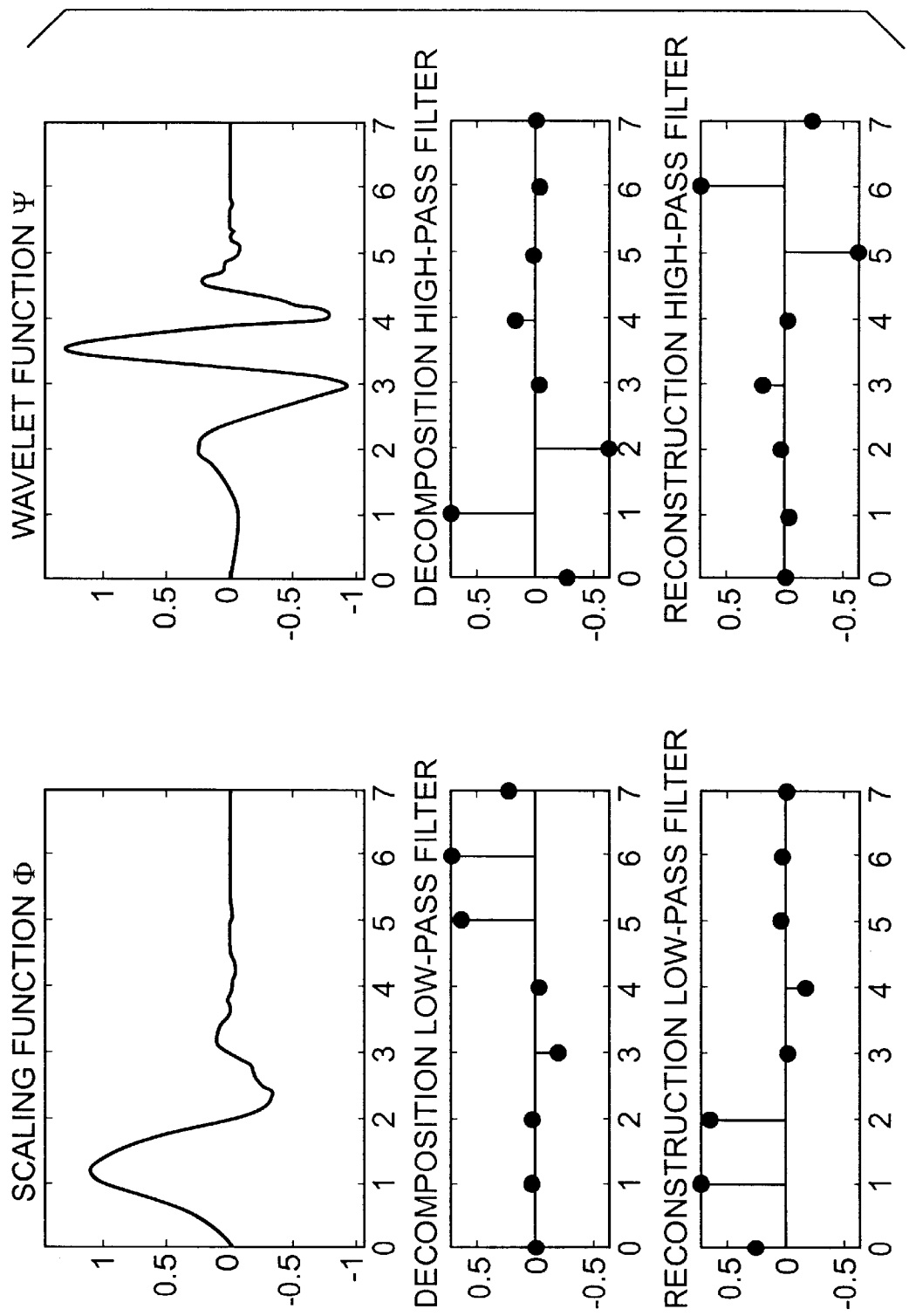
FIG. 14 shows a Daubechies 4 (D4) wavelet transform pair with equivalent decomposition and reconstruction low pass and high pass filter.

FIG. 14 shows the Daubechies 4 (D4) wavelet transform pair along with the equivalent decomposition and reconstruction low pass and high pass filters which correspond with the functions Ø and A, respectively. These are well known in the art and are included herein for the purpose of completeness. The original signal forms a matrix of values such as in a raster scan of an image having rows and columns of values. Each row and column of the signal is passed through the filters in turn in the following manner. The first eight values in a row or column are multiplied by the amplitude values corresponding to abscissa 0 to 7 in the low pass filter, i.e., the first signal value by the amplitude value for abscissa 0, the second signal value by the amplitude value for abscissa 1, and so forth. Then, a weighted average is taken, and the resulting value corresponds to the first value in the resulting transform matrix, and so forth for the remaining values.

For the high pass filter, a set of differences between adjacent values is computed, and then weighted and combined as for the low pass filter.

Figure 15:
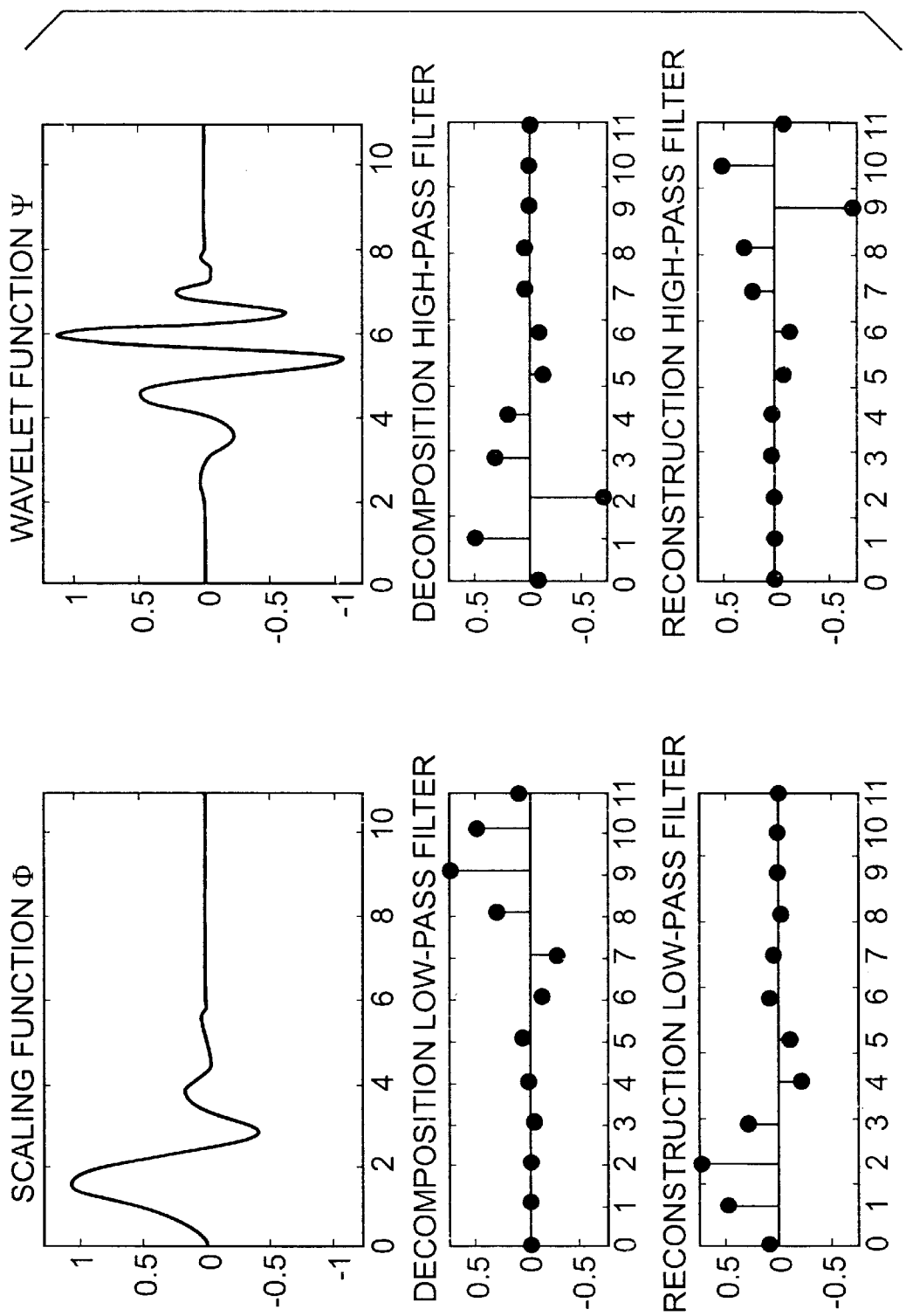
FIG. 15 shows a Daubechies 6 (D4) wavelet transform pair with equivalent decomposition and reconstruction low pass and high pass filter.
Figure 16:
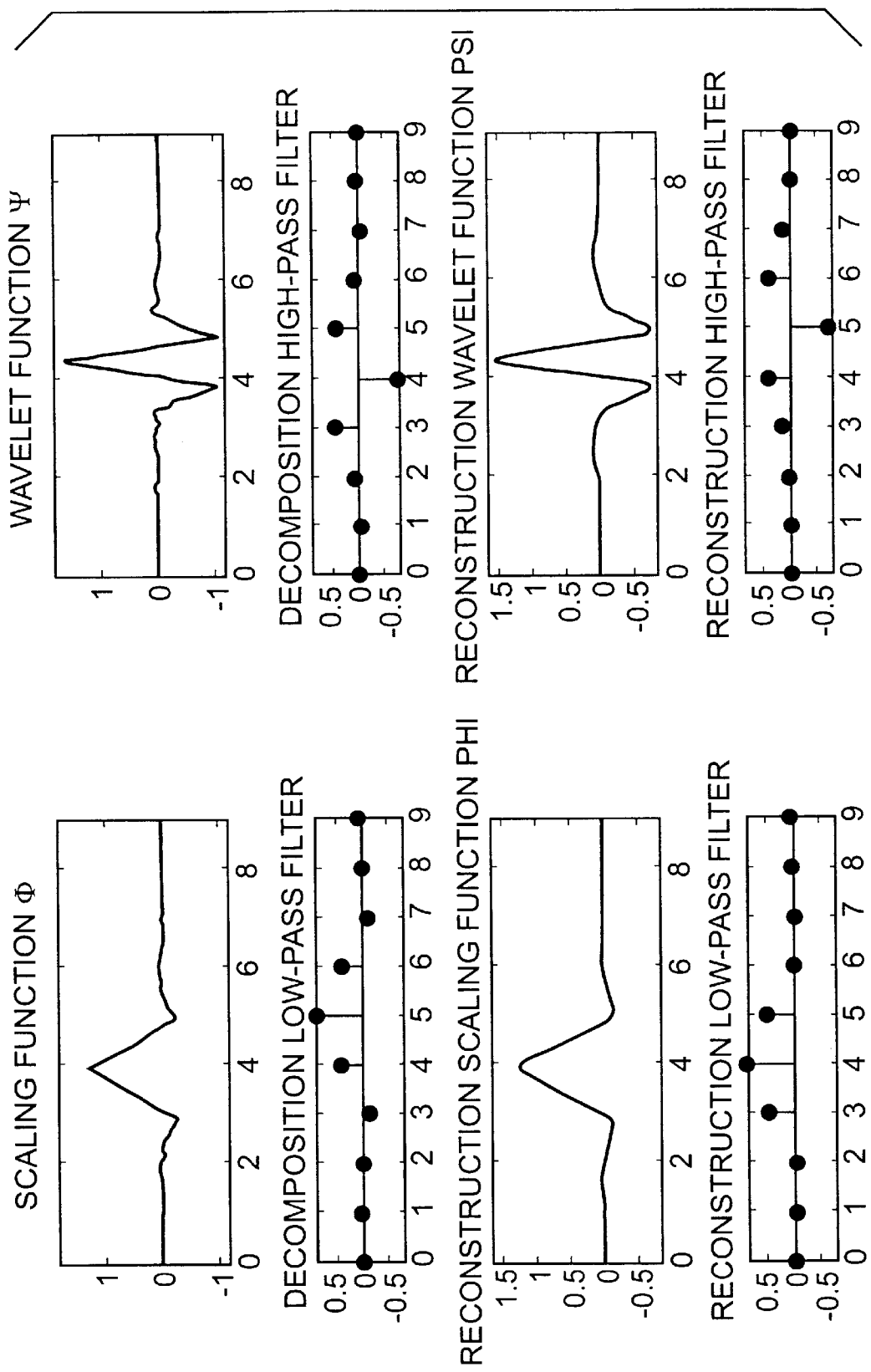
FIG. 16 shows a biorthogonal 4.4 wavelet transform pair with equivalent decomposition and reconstruction low pass and high pass filter.

FIG. 15 shows the same information for the Daubechies 6 (D6) wavelet transform, while FIG. 16 shows this information for the biorthogonal 4.4 wavelet transform. Any of the other known wavelet transforms, e.g. symmetric 8, may also be used. Certain wavelet transforms may be better suited to particular types of scenes, and in an apparatus according to the invention, the various wavelets would be stored, and either an operator would select the wavelet best suited for the scene, or such would be automatically accomplished by appropriate software. The system may also be made adaptive insofar as the specific wavelet levels which are employed, with certain levels (e.g. the 5th level as illustrated herein) providing best results with certain images, but other levels working better under different conditions and/or with different wavelet transforms.

An advantage of the present invention is that it is capable of obviating Poisson noise as well as Gaussian noise. Poisson noise is difficult to deal with because it occurs as part of the detection process and varies with detected signal amplitude, while Gaussian noise is independent of signal amplitude. In order to reduce Poisson noise, the sampling of the signal must take place at a time or spatial rate at least two times the maximum information frequency in the band-limited signal. For an audio sensor like a microphone, this means that a sample and hold/analog to digital converter which may be present at at least twice the maximum frequency that the preamplifier is capable of passing. Similarly, for a radio receiver, a sample and hold/analog to digital converter must sample at at least twice the maximum frequency passed by the detector/IF/preamp stages. In the case of imaging, this means that there must be at least two detectors within the central spot of the diffraction pattern of the optical system. Under these circumstances, it can be seen that any signal detected by only one detector is higher than the highest information frequency in the signal, and must be noise, which is segregated by frequency thresholding. It is noted that when used in connection with the superresolution processor of application Ser. No. 09/081,842 there would be at least five detectors with the central spot of the diffraction pattern of the optical system.

A further advantage of the invention is that complex images and simple images gain the same benefit in the signal to noise ratio. Thus, the method and apparatus of the invention are robust over a large class of image types.

Since information carrying signals are ubiquitous, the applications for which the invention may be used are numerous and include satellite-based imaging, including satellites which are controlled from the earth, aircraft-based imaging, land-based long-range imaging, underwater imaging, infrared imaging of any type, sonar imaging, LIDAR imaging, laser back-scatter imaging, laser rangefinder accuracy enhancement, atmospheric sounding accuracy enhancement, radar imaging noise reduction, doppler-radar noise cancellation imaging such as X-ray, CAT-scan, PET-scan, MRI, ultrasound imaging, Doppler ultrasound imaging, thermal imaging, audio noise cancellation, automobile suspension vibration cancellation, radio noise cancellation, servo-loop noise reduction, mechanical vibration reduction, precision low noise test measurement, environmental background noise cancellation, seismic data analysis noise reduction, Very-Low-Frequency communication noise reduction, television signal enhancement, superresolution imaging preprocessing, radio-astronomy noise cancellation, astronomical instrument image noise cancellation, computer network communications signal enhancement, and Internet/Intranet communications signal enhancement.

Figure 17:
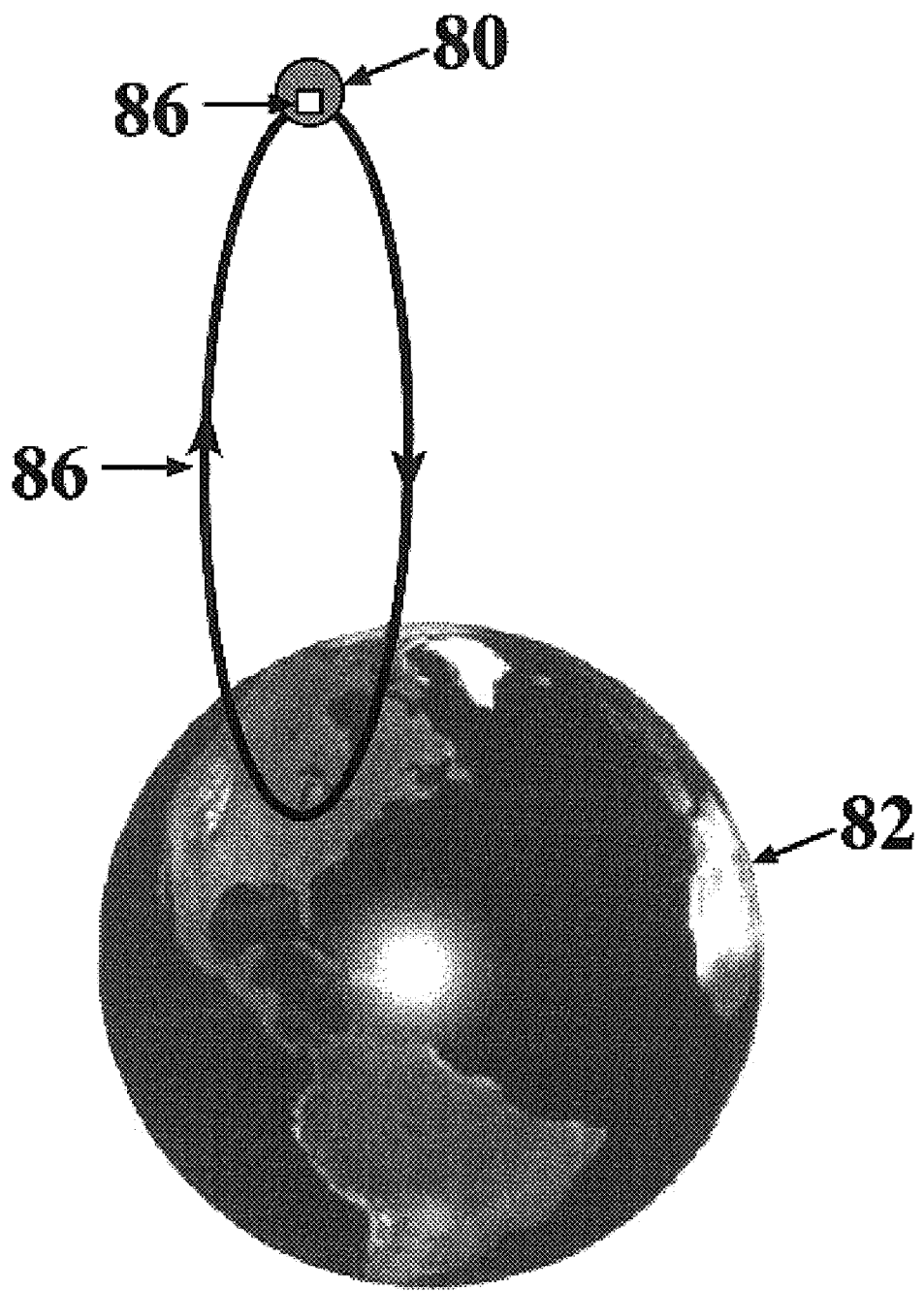
FIG. 17 shows an optical imaging apparatus incorporating the invention deployed on a satellite.

FIG. 17 shows a specific application of the invention as part of a satellite imaging system 84. Such a system would generally be the type of imaging system heretofore described, and would incorporate a wavelet noise processor apparatus as described herein. It would be borne by satellite 80, which would orbit the earth 82, and provide images of selected targets on the earth. The satellite (including the imaging process) may be controlled by control means located on the earth via communications link 86. For example, the imaging dwell time, field-of-view, and spectral bands of interest may be selected and controlled from the earth, using computers with radio or laser links to the satellite.

While the invention has been illustrated in connection with a preferred embodiment, variations which are within the spirit and scope of the invention will occur to those skilled in the art, and the invention to be covered is defined by the following claims.

What is claimed is:

1. An imaging apparatus, comprising,
   means for sampling image information to provide an image signal,
   means for computing a wavelet transform of the image signal up to a predetermined level such that the transform is comprised primarily of high frequency components which are attributable to noise, wherein each wavelet transform includes a wavelet scaling matrix and a wavelet coefficient matrix,
   means for constructing altered wavelet coefficient matrices for each level up to the predetermined level,
   means for deriving a frequency thresholded signal by computing an inverse wavelet transform for each level below the predetermined level, down to the level below the first level, while using for the computation for each level the wavelet scaling matrix and the altered wavelet coefficient matrix corresponding to the level above, and
   means for subtracting the frequency thresholded signal from the image signal to provide an image signal having an improved signal to noise ration.

2. The apparatus of claim 1 wherein the means for sampling image information performs sampling at at least two times the maximum frequency occurring in the image information.

3. The apparatus of claim 2 wherein the means for sampling includes a sensor comprising optics having a numerical aperture and detection means, wherein the detection means includes at least two detectors within the central spot of the diffraction pattern determined by the numerical aperture.

4. The apparatus of claim 1 in combination with an orbiting satellite, and further comprising means located on the earth for controlling the satellite.

5. A method of improving the signal to noise ratio of an information carrying signal, comprising the steps of:
   computing a wavelet transform of the information carrying signal up to a predetermined level, which wavelet transform is comprised of frequency components above a threshold frequency which are primarily attributable to noise,
   from the wavelet transform, deriving a corresponding frequency thresholded signal in the time domain which is indicative of noise, and
   subtracting the frequency thresholded signal in the time domain from the information carrying signal to provide a resultant having an improved signal to noise ratio.

6. The method of claim 5 wherein computing said wavelet transform up to said predetermined level results in a scaling matrix at said predetermined level which consists of said frequency components above a threshold frequency, and wherein the frequency composition of said frequency thresholded signal in the time domain is derived only from said scaling matrix at said predetermined level.

7. The method of claim 6 wherein the step of deriving a frequency thresholded signal which is indicative of noise includes computing an inverse wavelet transformation.

8. The method of claim 7 wherein computing each wavelet transform up to the predetermined level results in a wavelet scaling matrix which contains high frequencies and a wavelet coefficient matrix which contains low frequencies, and wherein the step of deriving a frequency thresholded signal includes constructing an altered wavelet coefficient matrix for each level up to the predetermined level.

9. The method of claim 8 wherein the step of driving a frequency thresholded signal further includes computing an inverse wavelet transform for each level below the predetermined level, down to the level below the first level, while using for the computation for each level the wavelet scaling matrix and the altered wavelet coefficient matrix corresponding to the level above.

10. The method of claim 9 wherein the altered wavelet coefficient matrix has all coefficients set to zero.

11. The method of claim 7 further including the step of generating a compensating signal to compensate for information from the information carrying signal which may be present in the frequency thresholded signal.

12. The method of claim 11 wherein the step of providing a compensating signal comprises computing inverse wavelet transforms from a particular level which is below the predetermined level down to the level below the first level, while for the computation for each such level using the wavelet scaling matrix and the altered wavelet coefficient matrix corresponding to the level above.

13. The method of claim 12 wherein the particular level below the predetermined level is the second level.

14. The method of claim 12 wherein the compensation is accomplished by subtracting the compensating signal from the information carrying signal to provide an intermediate signal, and adding the intermediate signal to the resultant signal.

15. The method of claim 14 further including the step of subtracting the frequency thresholded signal from the resultant signal.

16. An apparatus for improving the signal to noise ration of an information carrying signal, comprising,
a computer programmed to perform the steps of:
receiving the information carrying signal and computing a wavelet transform of such signal up to a predetermined level, which wavelet transform is comprised of frequency components above a threshold frequency which are primarily attributable to noise,
deriving from the wavelet transform, a corresponding frequency thresholded signal in the time domain which is indicative of noise, and
subtracting the frequency thresholded signal in the time domain from the information carrying signal to provide a resultant signal having an improved signal to noise ratio.

17. The method of claim 16 wherein computing said wavelet transform up to said predetermined level results in a scaling matrix at said predetermined level which consists of said frequency components above a threshold frequency, and wherein the frequency composition of said frequency thresholded signal in the time domain is derived only from said scaling matrix at said predetermined level.

18. The apparatus of claim 17 wherein the step of deriving a frequency thresholded signal which is indicative of noise includes computing an inverse wavelet form.

19. The apparatus of claim 18 wherein computing each wavelet transform up to the predetermined level results in a wavelet scaling matrix which contains high frequencies and a wavelet coefficient matrix which contains low frequencies, and wherein the step of deriving a frequency thresholded signal includes constructing an altered wavelet coefficient matrix for each level up to the predetermined level.

20. The apparatus of claim 19 wherein the step of deriving a frequency thresholded signal further includes computing an inverse wavelet transform for each level below the predetermined level, down to the level below the first level, while using for the computation for each level the wavelet scaling matrix and the altered wavelet coefficient matrix corresponding to the level above.

21. The apparatus of claim 20 wherein the altered wavelet coefficient matrix has all coefficients set to zero.

22. The apparatus of claim 18 wherein the computer is programmed to perform the step of generating a compensating signal to compensate for information from the information carrying signal which may be present in the frequency thresholded signal.

23. The apparatus of claim 22 wherein the computer is programmed to generate the compensating signal by computing inverse wavelet transforms from a particular level which below the predetermined level down to the level below the first level, while for the computation for each such level using the wavelet scaling matrix and the altered wavelet coefficient matrix corresponding to the level above.

24. The apparatus of claim 22 wherein the computer is programmed to subtract the compensating signal from the information carrying signal to produce an intermediate signal, and to add the intermediate signal to the resultant signal.

25. The apparatus of claim 24 wherein the computer is further programmed to subtract the frequency thresholded signal from the resultant signal.

26. A storage medium containing a set of instructions which can be implemented by a computer for performing the steps of;
computing a wavelet transform of the information carrying signal up to a predetermined level, which wavelet transform is comprised of frequency components above a threshold level which are primarily attributable to noise,
from the wavelet transform, deriving a corresponding frequency thresholded signal in the time domain which is indicative of noise, and
subtracting the frequency thresholded signal in the time domain from the information carrying signal to provide a resultant signal having an improved signal to noise ratio.

27. The storage medium of claim 26 wherein computing said wavelet transform up to said predetermined level results in a scaling matrix at said predetermined level which consists of said frequency components above a threshold frequency, and wherein the frequency composition of said frequency thresholded signal in the time domain is derived only from said scaling matrix at said predetermined level.

28. A method of improving the signal to noise ration of an information carrying signal, comprising the steps of:
computing a wavelet transform of the information carrying signal up to a predetermined level, said wavelet transform at the predetermined level being comprised primarily of high frequency components which are attributable to noise,
each wavelet transform up to the predetermined level including a wavelet scaling matrix which contains high frequencies and a wavelet coefficient matrix which contains low frequencies,
from the wavelet transform, deriving a frequency thresholded signal which is indicative of noise, said step of deriving including computing an inverse transform and constructing an altered wavelet coefficient matrix for each level up to the predetermined level, and
subtracting the frequency thresholded signal from the information carrying signal to provide a resultant signal having an improved signal to noise ratio.

29. The method of claim 28 wherein the step of deriving a frequency thresholded signal further includes computing an inverse wavelet transform for each level below the predetermined level, down to the level below the first level, while using for the computation for each level the wavelet scaling matrix and the altered wavelet coefficient matrix corresponding to the level above.

30. The method of claim 29 wherein the altered wavelet coefficient matrix has all coefficients set to zero.

31. The method of claim 30 further including the step of providing a compensating signal to compensate for information from the information carrying signal which may be present in the frequency thresholded signal.

32. The method of claim 30 wherein the information carrying signal is obtained by sampling the information at at least two times the maximum frequency occurring in the information.

33. The method of claims 32 wherein the information carrying signal is derived from an image.

34. The method of claim 29 wherein the altered wavelet coefficient matrix has all coefficients set to a selected non-zero level.

35. The method of claim 29 wherein the altered wavelet coefficient matrix has only coefficients below a predetermined amplitude threshold set to zero.

36. The method of claim 29 wherein the predetermined level is the fifth level wavelet transform.

37. The method of claim 28 further including the step of generating a compensating signal to compensate for information from the information carrying signal which may be present in the frequency thresholded signal.

38. The method of claim 37 wherein the step of providing a compensating signal comprises computing inverse wavelet transforms form a particular level which is below the predetermined level down to the level below the first level, while for the computation for each such level using the wavelet scaling matrix and the altered wavelet coefficient matrix corresponding to the level above.

39. The method of claim 38 wherein the particular level below the predetermined level is the second level.

40. The method of claim 28 wherein compensation is accomplished by subtracting the compensating signal from the information carrying signal to provide an intermediate signal, and adding the intermediate signal to the resultant signal.

41. The method of claim 40 further including the step of subtracting the frequency thresholded signal from the resultant signal.

42. The method of claim 28 further including the step of subtracting the frequency thresholded signal from the resultant signal.

43. The method of claim 28 wherein the wavelet transform at the predetermined level is comprised substantially of high frequency components which are attributable to noise.

44. The method of claim 28 wherein the information carrying signal is obtained by sampling the information at at least two times the maximum frequency occurring in the information.

45. The method of claim 28 wherein the information carrying signal is derived from an image.

46. The method of claim 45 further including the step of selecting the predetermined level in dependence on the image.

47. An apparatus for improving the signal to noise ratio of an information carrying signal, comprising;
   a computer programmed to perform the steps of:
   receiving the information carrying signal and computing a wavelet transform of such signal up to predetermined level, said wavelet transform at the predetermined level being comprised primarily of high frequency components which are attributable to noise, wherein
   deriving from the wavelet transform, a frequency thresholded signal which is indicative of noise, said step of deriving including computing an inverse transform and constructing an altered wavelength coefficient matrix for each level up to the predetermined level, and
   subtracting the frequency thresholded signal from the information carrying signal to provide a resultant signal having an improved signal to noise ratio.

48. The apparatus of claim 47 wherein the step of deriving a frequency thresholded signal further includes computing an inverse wavelet transform for each level below the predetermined level, down to the level below the first level, while using for the computation for each level the wavelet scaling matrix and the altered wavelet coefficient matrix corresponding to the level above.

49. The apparatus of claim 48 wherein the altered wavelet coefficient matrix has all coefficients set to zero.

50. The apparatus of claim 49 wherein the predetermined level is the fifth level wavelet transform.

51. The apparatus of claim 49 wherein the computer is further programmed to perform the step of generating a compensating signal to compensate for information from the information carrying signal which may be present in the frequency thresholded signal.

52. The apparatus of claim 48 wherein the altered wavelet coefficient matrix has all coefficients set to a predetermined non-zero value.

53. The apparatus of claim 48 wherein the altered wavelet coefficient matrix has only coefficients below a selected amplitude threshold set to zero.

54. The apparatus of claim 47 wherein the computer is programmed to perform the step of generating a compensating signal to compensate for information from the information carrying signal which maybe present in the frequency thresholded signal.

55. The apparatus of claim 54 wherein the computer is programmed to, generate the compensating signal by computing inverse wavelet transforms from a particular level which is below the predetermined level down to the level below the first level, while for the computation for each such level using the wavelet scaling matrix and the altered wavelet coefficient matrix corresponding to the level above.

56. The apparatus of claim 55 wherein the particular level below the predetermined level is the second level.

57. The apparatus of claim 54 wherein the computer is programmed to subtract the compensating signal from the information carrying signal to produce an intermediate signal, and to add the intermediate signal to the resultant signal.

58. The apparatus of claim 47 wherein the computer is further programmed to subtract the frequency thresholded signal from the resultant signal.

59. The apparatus of claim 57 wherein the computer is further programmed to subtract the frequency thresholded signal from the resultant signal.

60. The apparatus of claim 47 further including means for sampling the information carrying signal at at least two times the maximum frequency occurring in the information before the information carrying signal is received by the computer.

61. The apparatus of claim 60 wherein the information carrying signal is an image signal.

* * * * *